(12) United States Patent
Shiraishi et al.

(10) Patent No.: US 8,142,684 B2
(45) Date of Patent: Mar. 27, 2012

(54) METHOD OF MANUFACTURING BLUE SILICATE PHOSPHOR, AND BLUE SILICATE PHOSPHOR AND LIGHT-EMITTING DEVICE

(75) Inventors: Seigo Shiraishi, Osaka (JP); Kojiro Okuyama, Nara (JP); Masahiro Sakai, Kyoto (JP); Takehiro Zukawa, Osaka (JP)

(73) Assignee: Panasonic Corporation, Osaka (JP)

( * ) Notice: Subject to any disclaimer, the term of this patent is extended or adjusted under 35 U.S.C. 154(b) by 766 days.

(21) Appl. No.: 12/299,868

(22) PCT Filed: May 16, 2007

(86) PCT No.: PCT/JP2007/060062
§ 371 (c)(1),
(2), (4) Date: Nov. 6, 2008

(87) PCT Pub. No.: WO2007/135926
PCT Pub. Date: Nov. 29, 2007

(65) Prior Publication Data
US 2009/0218926 A1 Sep. 3, 2009

(30) Foreign Application Priority Data
May 18, 2006 (JP) ................................. 2006-139555

(51) Int. Cl.
C09K 11/08 (2006.01)

(52) U.S. Cl. .......................... 252/301.4 H; 252/301.4 R

(58) Field of Classification Search ............ 252/301.4 F, 252/301.6 R, 301.4 H; 313/467, 468, 503
See application file for complete search history.

(56) References Cited

U.S. PATENT DOCUMENTS

| 7,902,756 B2 * | 3/2011 | Sakai et al. .................... 313/582 |
| 2002/0172832 A1 * | 11/2002 | Nagano et al. ................ 428/472 |
| 2003/0085853 A1 | 5/2003 | Shiiki et al. |
| 2005/0264161 A1 * | 12/2005 | Oaku et al. .................... 313/486 |

FOREIGN PATENT DOCUMENTS

| JP | 2003-132803 A | 5/2003 |
| JP | 2004-026922 A | 1/2004 |
| JP | 2004-176010 A | 6/2004 |
| JP | 2005-330312 A | 12/2005 |
| JP | 2006-012770 A | 1/2006 |
| JP | 2007-217542 A | 8/2007 |
| JP | 4156020 B2 | 9/2008 |

OTHER PUBLICATIONS

Shao, Y. et al. "Excitation and luminescent characteristics of $(Sr,Ba)_3MgSi_2O_8:Eu^{2+}$ blue phosphors", IEICE Technical Report, The Institute of Electronics, Information and Communication Engineers, vol. 105, No. 568, pp. 53-56. Abstract attached. Jung, H. et al. "Luminescent properties of $Eu^{2+}$-activated $(Ba,Sr)_3MgSi_2O_8$ phosphor under VUV irradiation", Optical Materials, vol. 28, 2006, pp. 602-605.

* cited by examiner

Primary Examiner — Jerry Lorengo
Assistant Examiner — Lynne Edmondson
(74) Attorney, Agent, or Firm — Hamre, Schumann, Mueller & Larson, P.C.

(57) ABSTRACT

The present invention provides a method of manufacturing a blue silicate phosphor having high luminance and a chromaticity y comparable to or lower than that of BAM:Eu. The present invention is a method of manufacturing a blue silicate phosphor represented by the general formula $aAO \cdot bEuO \cdot (Mg_{1-w},Zn_w)O \cdot cSiO_2 \cdot dCaCl_2$, where A is at least one selected from Sr, Ba and Ca, and $2.970 \leq a \leq 3.500$, $0.006 \leq b \leq 0.030$, $1.900 \leq c \leq 2.100$, $0 \leq d \leq 0.05$, and $0 \leq w \leq 1$ are satisfied. In this manufacturing method, heat treatment is carried out in a gas atmosphere having an oxygen partial pressure of $1 \times 10^{-15.5}$ atm to $1 \times 10^{-10}$ atm at a temperature of 1200° C. to 1400° C.

6 Claims, 3 Drawing Sheets

METHOD OF MANUFACTURING BLUE SILICATE PHOSPHOR, AND BLUE SILICATE PHOSPHOR AND LIGHT-EMITTING DEVICE

TECHNICAL FIELD

The present invention relates to a method of manufacturing a blue silicate phosphor, a blue silicate phosphor, and a light-emitting device having a phosphor layer in which the blue silicate phosphor is used.

BACKGROUND ART

Various aluminate phosphors have been put to practical use as phosphors for energy-saving fluorescent lamps. As a blue phosphor, for example, $(Ba,Sr)MgAl_{10}O_{17}$:Eu (hereinafter referred to as "BAM:Eu") is mentioned. As a green phosphor, for example, $CeMgAl_{11}O_{19}$:Tb, $BaMgAl_{10}O_{17}$:Eu,Mn, and the like are mentioned. In recent years, BAM:Eu, which has high luminance under vacuum-ultraviolet excitation, has been used as a blue phosphor for various commercially available PDPs.

However, when a PDP, especially one using the blue phosphor BAM:Eu, is driven for a long period, the luminance is degraded significantly. Hence, in the PDP use, there is a strong demand for a phosphor that shows less luminance degradation even after the long-time driving.

In response to this demand, JP 2003-132803 A, JP 2004-176010 A, and "Excitation and Luminescent Characteristics of $(Sr,Ba)_3MgSi_2O_8$:$Eu^{2+}$ Blue Phosphors" (IEICE technical report, The Institute of Electronics, Information and Communication Engineers, Vol. 105, No. 568, pp. 53-56) propose methods using silicate phosphors such as $Sr_{3-e}MgSi_2O_8$:$Eu_e$ (where $0.01 \leq e \leq 0.1$) and $(Sr_{1-y},Ba_y)_{3-f}MgSi_2O_8$:$Eu_f$ (where $0 \leq y \leq 1$ and $0.01 \leq f \leq 0.1$). "Excitation and Luminescent Characteristics of $(Sr,Ba)_3MgSi_2O_8$:$Eu^{2+}$ Blue Phosphors" also proposes a technique for adjusting color purity by replacing part of the Sr sites in a silicate phosphor $Sr_{3-e}MgSi_2O_8$:$Eu_e$ with Ba. JP 2006-12770 A also proposes a use of $M_{3-g}MgSi_2O_8$:$Eu_g$ (where M is at least one element selected from a group consisting of Sr, Ca and Ba, and $0.001 \leq g \leq 0.2$).

The silicate phosphor $Sr_{3-e}MgSi_2O_8$:$Eu_e$ is proposed as a phosphor that shows less luminance degradation even after the long-time driving when it is used for a PDP. However, it has a problem that the chromaticity y is higher and the color purity is worse than those of a blue phosphor BAM:Eu that is currently used in the PDP.

On the other hand, the color purity can be adjusted to a level comparable to that of BAM by replacing part of Sr with Ba so as to obtain a silicate phosphor represented by $(Sr_{1-y},Ba_y)_{3-f}MgSi_2O_8$:$Eu_f$. Yet, such a phosphor has a problem of the luminance being lowered. For example, the above-mentioned non-patent document 1 reports that the emission peak intensity of the phosphor is lowered to about 60% to 70% of that of the commercially available BAM:Eu phosphor.

Thus, blue silicate phosphors having both good luminance and chromaticity y have not been obtained so far.

DISCLOSURE OF INVENTION

The present invention has achieved a solution to the above conventional problems, and it is an object of the present invention to provide a method of manufacturing a blue silicate phosphor having high luminance and a chromaticity y comparable to or lower than that of BAM:Eu. It is another object of the present invention to provide a long-life light-emitting device having good luminance and color purity, and a blue silicate phosphor to be used for the light-emitting device.

In order to solve the above conventional problems, the present invention provides a method of manufacturing a blue silicate phosphor represented by the general formula $aAO \cdot bEuO \cdot (Mg_{1-w},Zn_w)O \cdot cSiO_2 \cdot dCaCl_2$, where A is at least one selected from Sr, Ba and Ca, and $2.970 \leq a \leq 3.500$, $0.006 \leq b \leq 0.030$, $1.900 \leq c \leq 2.100$, $0 \leq d \leq 0.05$, and $0 \leq w \leq 1$ are satisfied. This manufacturing method includes subjecting a mixture of source materials to heat treatment in a gas atmosphere having an oxygen partial pressure of $1 \times 10^{-15.5}$ atm to $1 \times 10^{-10}$ atm at a temperature of 1200° C. to 1400° C.

The oxygen partial pressure is preferably $1 \times 10^{-13.0}$ atm to $1 \times 10^{-10.1}$ atm, and more preferably $1 \times 10^{-12.41}$ atm to $1 \times 10^{-11}$ atm.

The phosphor obtained by the manufacturing method preferably is represented by the general formula $a(Sr_{1-x},A'_x)O \cdot bEuO \cdot MgO \cdot cSiO_2 \cdot dCaCl_2$, where A' is at least one selected from Ba and Ca, $0 \leq x \leq 0.3$, and the values of a, b, c and d are the same as the values as described above. More preferably, the phosphor is represented by the general formula $aSrO \cdot bEuO \cdot MgO \cdot cSiO_2 \cdot dCaCl_2$, where the values of a, b, c and d are the same as the values as described above. Furthermore, it is preferable that $2.982 \leq a \leq 2.994$, $0.006 \leq b \leq 0.018$, $c=2.00$, and $0 < d \leq 0.02$ are satisfied.

The present invention also is a blue silicate phosphor obtained by the above-mentioned manufacturing method. In this blue silicate phosphor, a chromaticity y in the XYZ color coordinate system of International Commission on Illumination is 0.05 to 0.07 for a light emission in the visible region obtained by irradiating the blue silicate phosphor with vacuum ultraviolet light at a wavelength of 146 nm. The chromaticity y also can be 0.05 to 0.06. The blue silicate phosphor has a property of a relative emission intensity Y/y with respect to an emission intensity Y/y of a standard sample being 90 or more when the standard sample is $Ba_{0.8}Sr_{0.1}Eu_{0.1}MgAl_{10}O_{17}$ obtained by firing in a nitrogen gas atmosphere containing 3% of hydrogen at a temperature of 1400° C. for 4 hours and the emission intensity Y/y of the standard sample is set to 100. Accordingly, the blue silicate phosphor of the present invention has a chromaticity y comparable to or lower than that of BAM:Eu and has excellent luminance.

Next, the light-emitting device of the present invention is a light-emitting device containing the above-mentioned phosphor in the phosphor layer. This light-emitting device (for example, a PDP, a fluorescent panel, a fluorescent lamp, etc.) has a blue luminance and chromaticity comparable to or better than those of a light-emitting device using BAM:Eu that is used conventionally. In addition, this light-emitting device has excellent resistance to luminance degradation.

Lastly, the PDP of the present invention includes: a front panel; a back panel that is arranged to face the front panel; barrier ribs that define the clearance between the front panel and the back panel; a pair of electrodes that are disposed on the back panel or the front panel; an external circuit that is connected to the electrodes; a discharge gas that is present at least between the electrodes and contains xenon that generates a vacuum ultraviolet ray by applying a voltage between the electrodes through the external circuit; and phosphor layers that emit visible light induced by the vacuum ultraviolet ray. The phosphor layers include a blue phosphor layer, and the blue phosphor layer contains the present blue phosphor. This PDP has a blue luminance and color purity comparable to or better than those of a PDP using BAM:Eu that is used conventionally. In addition, the PDP has excellent resistance to luminance degradation along with image display.

According to the manufacturing method of the present invention, it is possible to obtain a blue silicate phosphor having a luminance comparable to or better than that of BAM:Eu that is used conventionally and having a chromaticity y comparable to or lower than that of BAM:Eu. This blue silicate phosphor also has a property of excellent resistance to luminance degradation even after a long-time driving of a PDP or the like, which is one of the characteristics of a blue silicate phosphor. Moreover, a light-emitting device, such as a plasma display panel, using the phosphor obtained by the manufacturing method of the present invention is a long-life product having good luminance and color purity and a property of low degradation of luminance and chromaticity even after a long-time driving.

BEST MODE FOR CARRYING OUT THE INVENTION

Figure 1:
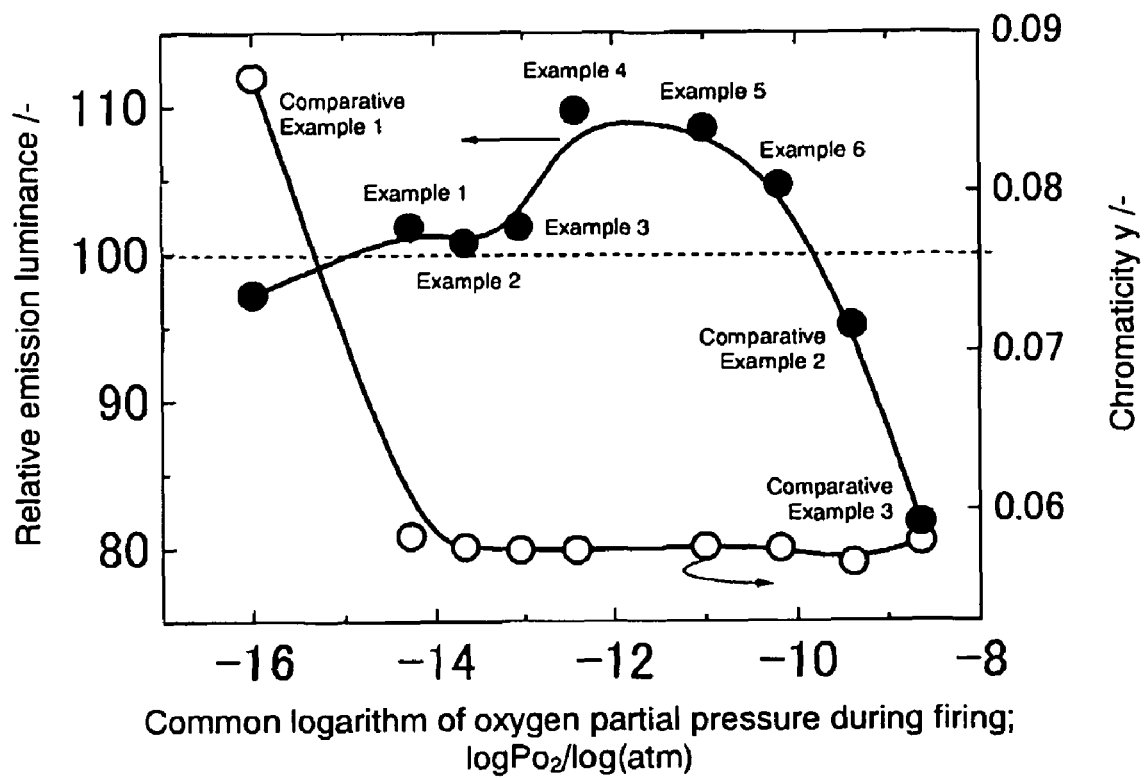
FIG. 1 is a graph showing a relationship between oxygen partial pressures during firing and relative emission luminances in Examples and Comparative Examples.

In the manufacturing method of the present invention, a blue silicate phosphor is obtained in the following manner. Source materials are typically mixed, and the mixture is pre-fired, if necessary, and then subjected to a heat treatment (firing) in a gas atmosphere having an oxygen partial pressure of $1\times10^{-15.5}$ atm to $1\times10^{-10}$ atm at a temperature of 1200° C. to 1400° C.

First, source materials to be used in the present invention will be described.

As a strontium source material, a strontium compound that can be converted into strontium oxide by firing, such as strontium hydroxide, strontium carbonate, strontium nitrate, strontium halide, and strontium oxalate, each having high purity (purity of 99% or more) may be used. Strontium oxide having high purity (purity of 99% or more) also may be used.

As a barium source material, a barium compound that can be converted into barium oxide by firing, such as barium hydroxide, barium carbonate, barium nitrate, barium halide, and barium oxalate, each having high purity (purity of 99% or more) may be used. Barium oxide having high purity (purity of 99% or more) also may be used.

As a calcium source material, a calcium compound that can be converted into calcium oxide by firing, such as calcium hydroxide, calcium carbonate, calcium nitrate, calcium halide, and calcium oxalate, each having high purity (purity of 99% or more) may be used. Calcium oxide having high purity (purity of 99% or more) also may be used.

As a europium source material, a europium compound that can be converted into europium oxide by firing, such as europium hydroxide, europium carbonate, europium nitrate, europium halide, and europium oxalate, each having high purity (purity of 99% or more) may be used. Europium oxide having high purity (purity of 99% or more) also may be used.

As a magnesium source material, a magnesium compound that can be converted into magnesium oxide by firing, such as magnesium hydroxide, magnesium carbonate, magnesium nitrate, magnesium halide, magnesium oxalate, and basic magnesium carbonate, each having high purity (purity of 99% or more) may be used. Magnesium oxide having high purity (purity of 99% or more) also may be used.

As a zinc source material, various zinc source materials that can be converted into oxides may be used in the same way.

As a silicon source material, various silicon source materials that can be converted into oxides may be used in the same way.

As a calcium chloride source material, calcium chloride having high purity (purity of 99% or more) may be used.

It should be noted that in addition to the above-mentioned source materials, a chloride or a fluoride may be added as a flux.

These source materials are mixed. Since coarse particles in the source materials adversely affect the light-emitting property, it is preferable that the particles are classified to improve particle size uniformity before mixing the materials. These source materials may be mixed so that a ratio of each metal element, Si element and $CaCl_2$ in the source materials conforms to a ratio of each metal element, Si element and $CaCl_2$ in a desired blue silicate phosphor. As a method of mixing these source materials, conventional mixing methods, which are in wide industrial use, can be employed. The mixing method may be wet mixing in a solution or dry mixing of dry powders. A ball mill, a stirred media mill, a planetary mill, a vibration mill, a jet mill, a V-type mixer, an agitator, and the like, which are in general industrial use, may be used.

When a hydroxide, a carbonate, a nitrate, a halide, an oxalate or the like that can be converted into oxide by firing is used as a source material, it is preferable that such a source material is subjected to pre-firing before main firing. More specifically, pre-firing is carried out in air atmosphere at 900° C. to 1300° C. for 1 to 10 hours.

The resulting mixture is subjected to heat treatment (firing) in a gas atmosphere having an oxygen partial pressure of $1\times10^{-15.5}$ atm ($1.013\times10^{-10.5}$ Pa) to $1\times10^{-10}$ atm ($1.013\times10^{-5}$ Pa) at 1200° C. to 1400° C. From the viewpoint of the luminance of a phosphor to be obtained, the oxygen partial pressure is preferably $1\times10^{-13.0}$ atm to $1\times10^{-10.1}$ atm, and more preferably $1\times10^{-12.41}$ atm to $1\times10^{-11}$ atm.

As a furnace to be used for the heat treatment, furnaces that are in general industrial use may be used. Specifically, a gas furnace or an electric furnace of batch type or continuous type such as a pusher furnace may be used.

Figure 2:
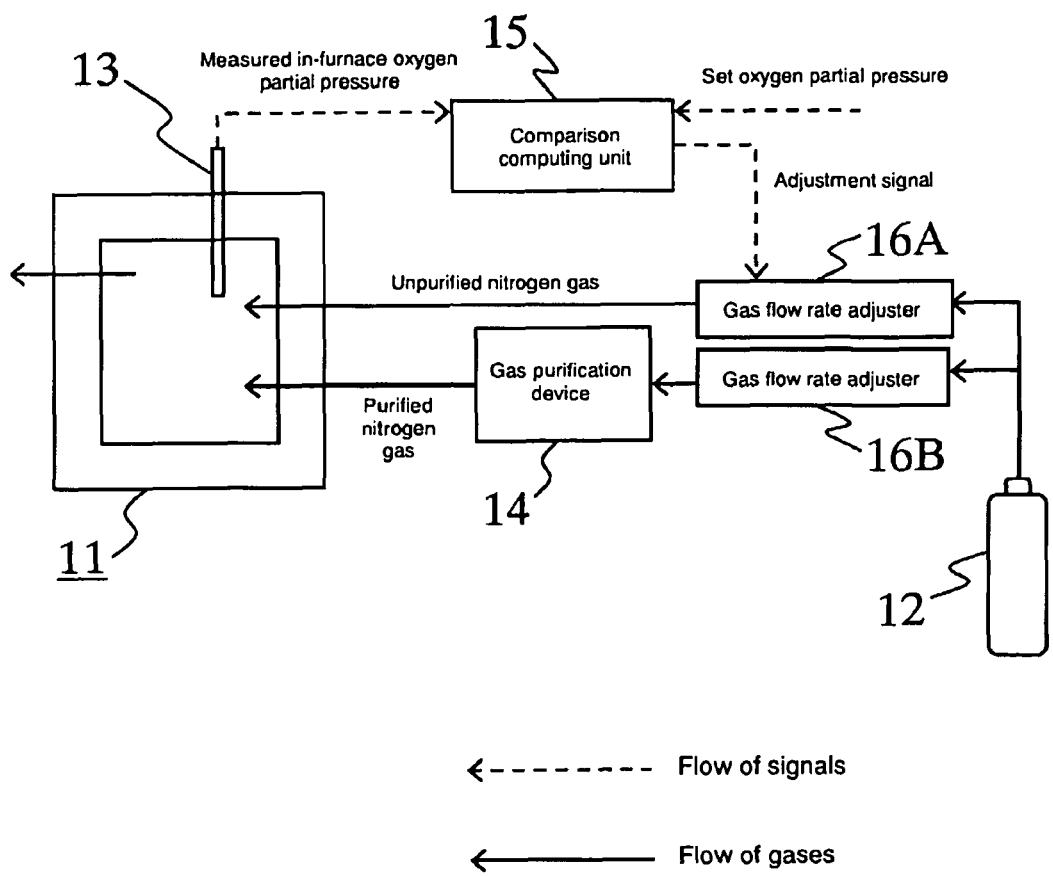
FIG. 2 is a diagram showing one example of a method of adjusting an oxygen partial pressure during heat treatment in the manufacturing method of the present invention.

The method of adjusting the oxygen partial pressure during the heat treatment is not particularly limited. A simple gas mixing method can be used. The simple gas mixing method as one embodiment for carrying out the present invention will be described with reference to FIG. 2. A firing furnace 11 including an oxygen sensor 13 as a means for measuring an oxygen partial pressure is prepared. The firing furnace 11 is one adjustable to a desired temperature. In addition, a nitrogen gas cylinder 12 as a means for supplying gas, gas flow rate adjusters 16A and 16B for two lines, a gas purification device 14 that functions to minimize residual oxygen in the gas to be supplied, and a comparison computing unit 15 are prepared. The operations of these devices will be described according to the flow of signals and the flow of the gases. The firing furnace 11 includes two lines of gas supplying means: a supply line for an unpurified nitrogen gas containing about $1\times10^{-6}$ atm of residual oxygen supplied from the nitrogen gas cylinder 12 through the gas flow rate adjuster 16A and; a supply line for a purified nitrogen gas in which residual oxygen has been removed, supplied from the nitrogen gas cylinder 12 through the gas flow rate adjuster 16B and the gas purification device 14. The purified nitrogen gas is supplied at a constant rate while the unpurified nitrogen gas is supplied under appropriate control, and thereby the oxygen partial pressure in the firing furnace can be controlled to maintain a desired value. Specifically, in order to increase the value of the oxygen partial pressure from the current value, the amount of the unpurified nitrogen gas to be supplied may be controlled to be increased. On the contrary, in order to decrease the value of the oxygen partial pressure from the current value, the amount of the unpurified nitrogen gas to be supplied may be controlled to be decreased. More specifically, first, a set value of the oxygen partial pressure as a desired value to be adjusted and an in-furnace oxygen partial pressure measured by the oxygen sensor 13 mounted in the firing furnace 11 are inputted to the comparison computing unit 15. The comparison computing unit 15 compares these two values inputted thereto. When the measured in-furnace oxygen partial pressure is lower than the set oxygen partial pressure, the comparison computing unit 15 controls the gas flow rate adjuster 16A so that the amount of the unpurified nitrogen gas to be supplied therefrom is adjusted to be increased. On the other hand, when the measured in-furnace oxygen partial pressure is higher than the set oxygen partial pressure, the comparison computing unit 15 controls the gas flow rate adjuster 16A so that the amount of the unpurified nitrogen gas to be supplied therefrom is adjusted to be decreased. By repeating a series of these operations continuously, the oxygen partial pressure in the firing furnace can be adjusted to a desired level.

A buffer gas mixing method also can be used. More specifically, a technique for adjusting an oxygen partial pressure by means of a buffer gas consisting of a gas mixture of water vapor and hydrogen, carbon dioxide and carbon monoxide, carbon dioxide and hydrogen, or the like can be used suitably.

The heat treatment time is preferably 1 to 10 hours.

The crystal structure of a phosphor may vary depending on the classification conditions and heat treatment conditions. Therefore, it is preferred to adjust, as appropriate, the heat treatment temperature within the above-mentioned temperature range, with consideration given to reactivity of the source materials and the classified state thereof, which affects reactivity. By doing so, a phosphor having better properties can be obtained.

The particle size distribution and flowability of the phosphor powder can be adjusted by crushing the obtained phosphor powder again using a ball mill, a jet mill, or the like, and further by washing or classifying it, if necessary.

It should be noted that there is no particular limitation on how to carry out the steps other than the step of performing heat treatment in a gas atmosphere with a certain oxygen partial pressure in the present invention. Various known methods can be used therefor.

The phosphor obtained by the manufacturing method of the present invention is represented by the general formula $aAO \cdot bEuO \cdot (Mg_{1-w}Zn_w)O \cdot cSiO_2 \cdot dCaCl_2$, where A is at least one selected from Sr, Ba and Ca, and $2.970 \leq a \leq 3.500$, $0.006 \leq b \leq 0.030$, $1.900 \leq c \leq 2.100$, $0 \leq d \leq 0.05$, and $0 \leq w \leq 1$ are satisfied. A is preferably $(Sr_{1-x}A'_x)$, where A' is at least one selected from Ba and Ca, and $0 \leq x \leq 0.3$, and more preferably, A is Sr. It is preferable that w is 0. It is further preferable that $2.982 \leq a \leq 2.994$, $0.006 \leq b \leq 0.018$, $c = 2.00$, and $0 < d \leq 0.02$ are satisfied.

In the phosphor obtained by the manufacturing method of the present invention, a chromaticity y in the XYZ color coordinate system of International Commission on Illumination is 0.05 to 0.07 for a light emission in the visible region obtained by irradiating the blue silicate phosphor with vacuum ultraviolet light at a wavelength of 146 nm. In some cases, the chromaticity y reaches 0.05 to 0.06. No prior blue silicate phosphor has been reported to have a chromaticity y in such a value range, and therefore, this blue silicate phosphor can be used extremely suitably for a display such as a PDP. In addition, this blue silicate phosphor has the following property for the luminance of the light emission as described above: a relative emission intensity Y/y with respect to an emission intensity Y/y of a standard sample in the XYZ color coordinate system of International Commission on Illumination is 90 or more when the standard sample is $Ba_{0.8}Sr_{0.1}Eu_{0.1}MgAl_{10}O_{17}$ obtained by firing in a nitrogen gas atmosphere containing 3% of hydrogen at a temperature of 1400° C. for 4 hours and the emission intensity Y/y of the standard sample is set to 100. The blue silicate phosphor having a chromaticity y in the above-mentioned value range and a luminance in this value range can be used extremely suitably for a display such as a PDP. In addition, when it is used as a display product, it is effective in enhancing the luminance thereof. Preferably, the relative emission intensity Y/y is 100 or more.

Specifically, the standard sample represented by $Ba_{0.8}Sr_{0.1}Eu_{0.1}MgAl_{10}O_{17}$ as described above can be obtained in the following manner. A mixed powder of 0.80 mol of barium carbonate, 0.10 mol of strontium carbonate, 0.05 mol of europium oxide, 1.00 mol of magnesium carbonate, 5.00 mol of aluminum oxide, and 0.01 mol of aluminum fluoride, each having high purity (purity of 99.99% or more) is heated in an air atmosphere at 1300° C. for 4 hours for pre-firing. After that, this pre-fired powder is fired in a mixed gas atmosphere of 3% of hydrogen and 97% of nitrogen at 1400° C. for 4 hours.

A light-emitting device having good luminance, color purity and luminance retaining rate can be constructed by applying the phosphor obtained by the manufacturing method of the present invention to a light-emitting device having a phosphor layer. Specifically, for a light-emitting device having a phosphor layer using BAM:Eu, all or part of BAM:Eu is replaced with the phosphor obtained by the manufacturing method of the present invention, while a light-emitting device may be constructed according to a known method. Examples of the light-emitting device include a plasma display panel, a fluorescent panel, and a fluorescent lamp, and among them, a plasma display panel is suitable.

Figure 3:
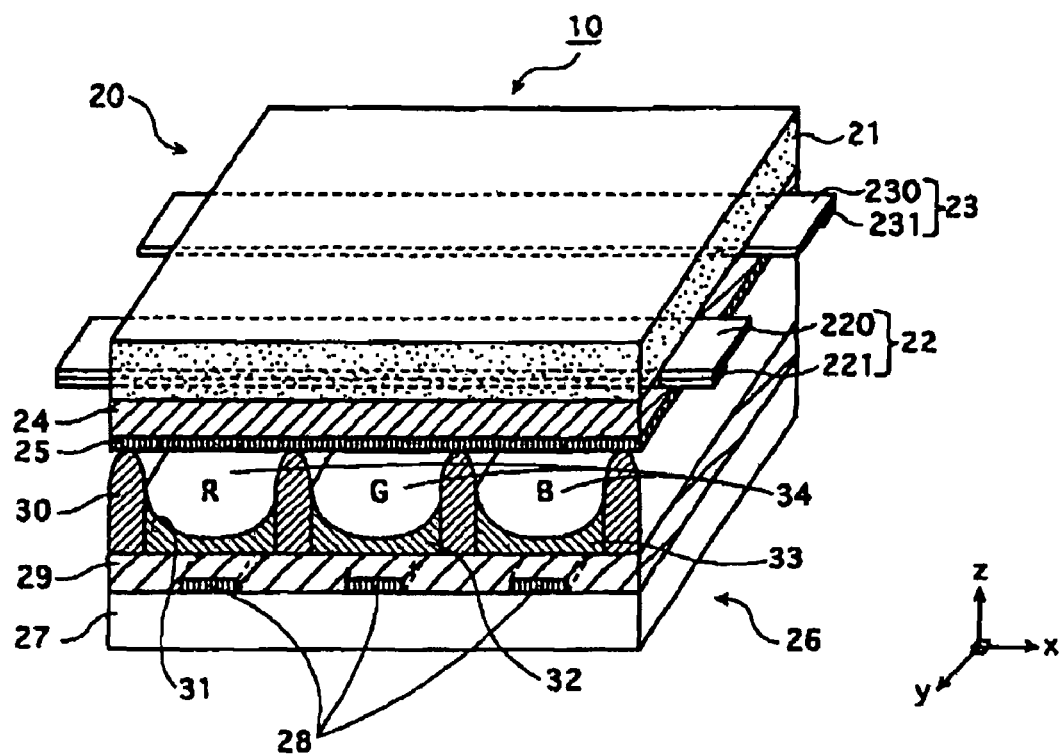
FIG. 3 is a schematic cross-sectional perspective view showing one example of a structure of a PDP in which the phosphor obtained by the manufacturing method of the present invention is used.

Hereinafter, an embodiment wherein the phosphor obtained by the manufacturing method of the present invention is applied to a PDP will be described with an example of an AC surface-discharge type PDP. FIG. 3 is a cross-sectional perspective view showing a principal structure of an AC surface-discharge type PDP 10. It should be noted that the PDP shown here is illustrated for convenience' sake with a size that is appropriate for a specification of 1024×768 pixels, which is 42-inch class, and the present invention may be applied to other sizes and specifications as well.

As illustrated in FIG. 3, this PDP 10 includes a front panel 20 and a back panel 26, and these panels are arranged with their main surfaces facing each other.

The front panel 20 includes a front panel glass 21 as a front substrate, strip-shaped display electrodes (X-electrode 23, Y-electrode 22) provided on one main surface of the front panel glass 21, a front-side dielectric layer 24 having a thickness of about 30 μm covering the display electrodes, and a protective layer 25 having a thickness of about 1.0 μm provided on the front-side dielectric layer 24.

The above display electrode includes a strip-shaped transparent electrode 220 (230) having a thickness of 0.1 μm and width of 150 μm, and a bus line 221 (231) having a thickness of 7 μm and width of 95 μm and laid on the transparent electrode. A plurality of pairs of the display electrodes are disposed in the y-axis direction, where the x-axis direction is a longitudinal direction.

Each pair of display electrodes (X-electrode 23, Y-electrode 22) is connected electrically to a panel drive circuit (not shown) in the vicinity of the ends of the width direction (y-axis direction) of the front panel glass 21. It should be noted that the Y-electrodes 22 are connected collectively to the panel drive circuit and the X-electrodes 23 are each independently connected to the panel drive circuit. When the Y-electrodes 22 and the certain X-electrodes 23 are fed using the panel drive circuit, a surface discharge (sustained discharge) is generated in the gap (approximately 80 μM) between the X-electrode 23 and the Y-electrode 22. The X-electrode 23 can operate as a scan electrode, and in this case, a write discharge (address discharge) can be generated between the X-electrode 23 and an address electrode 28 to be described later.

The above-mentioned back panel 26 includes a back panel glass 27 as a back substrate, a plurality of address electrodes 28, a back-side dielectric layer 29, barrier ribs 30, and phosphor layers 31 to 33, each of which corresponds to one color of red (R), green (G), and blue (B). The phosphor layers 31 to 33 are provided so that they contact with side walls of two adjacent barrier ribs 30 and with the back-side dielectric layer 29 between the adjacent barrier ribs 30, and repeatedly disposed in sequence in the x-axis direction.

The blue phosphor layer (B) contains the blue silicate phosphor obtained by the manufacturing method of the present invention. It should be noted that the blue silicate phosphor may be used alone or used as a mixture with another blue silicate phosphor obtained by separately carrying out the manufacturing method of the present invention. Furthermore, the blue silicate phosphor may be used as a mixture with a known phosphor such as BAM:Eu. On the other hand, the red phosphor layer and the green phosphor layer contain commonly-used phosphors. Examples of a red phosphor include $(Y,Gd)BO_3:Eu$ and $Y_2O_3:Eu$, and examples of a green phosphor include $Zn_2SiO_4:Mn$, $YBO_3:Tb$, and $(Y,Gd)BO_3:Tb$.

Each phosphor layer can be formed by applying a phosphor ink in which phosphor particles are dissolved to the barrier ribs 30 and the back-side dielectric layer 29 by a known applying method such as a meniscus method and a line jet method, and drying and firing (e.g., at 500° C., for 10 minutes) them. The above-mentioned phosphor ink can be prepared, for example, by mixing 30% by mass of the blue phosphor with a volume average particle diameter of 2 μm, 4.5% by mass of ethyl cellulose with a weight average molecular weight of about 200,000, and 65.5% by mass of butyl carbitol acetate. In this regard, it is preferable that a viscosity thereof is adjusted eventually to about 2000 to 6000 cps (2 to 6 Pas), because the adherence of the ink to the barrier ribs 30 can be enhanced.

The address electrodes 28 are provided on the one main surface of the back panel glass 27. The back-side dielectric layer 29 is provided so as to cover the address electrodes 28. The barrier ribs 30 have a height of about 150 μm and a width of about 40 μm, and the longitudinal direction is the y-axis direction. The barrier ribs 30 are provided on the back-side dielectric layer 29 so as to correspond to the pitch of the adjacent address electrodes 28.

Each of the address electrodes 28 has a thickness of 5 μm and a width of 60 μm. A plurality of address electrodes 28 are disposed in the x-axis direction, where the y-axis direction is a longitudinal direction. The address electrodes 28 are disposed at a certain pitch (about 150 μm). A plurality of address electrodes 28 are each independently connected to the above-mentioned panel drive circuit. Address discharge can be generated between a certain address electrode 28 and a certain X-electrode 23 by feeding each address electrode individually.

The front panel 20 and the back panel 26 are disposed so that the address electrode 28 and the display electrode are orthogonal to each other. The peripheral portions of both the panels 20 and 26 are bonded and sealed with a frit glass sealing portion (not shown) that serves as a sealing member. An enclosed space between the front panel 20 and the back panel 26, which has been bonded and sealed with the frit glass sealing portion, is filled with a discharge gas composed of a rare gas such as He, Xe and Ne at a predetermined pressure (ordinarily about $6.7 \times 10^4$ to $1.0 \times 10^5$ Pa).

It should be noted that a space corresponding to a space between two adjacent barrier ribs 30 is a discharge space 34. A region where a pair of display electrodes and one address electrode 28 intersect with the discharge space 34 in between corresponds to a cell used for displaying images. It should be noted that in this embodiment, the cell pitch in the x-axis direction is set to approximately 300 μm and the cell pitch in the y-axis direction is set to approximately 675 μm.

When the PDP 10 is driven, a sustained discharge is generated by applying a pulse to between a pair of the display electrodes (X-electrode 23, Y-electrode 22) after an address discharge is generated by applying a pulse voltage to the certain address electrode 28 and the certain X-electrode 23 by the panel drive circuit. The phosphors contained in the phosphor layers 31 to 33 are allowed to emit visible light using the ultraviolet ray with a short wavelength (a resonance line with a central wavelength of about 147 nm and a molecular beam with a central wavelength of 172 nm) thus generated. Thereby, a prescribed image can be displayed on the front panel side.

The phosphor obtained by the manufacturing method of the present invention can be applied to a fluorescent panel including a fluorescent layer that is excited by an ultraviolet ray and then emits light according to a known manner. This fluorescent panel has higher luminance and excellent resistance to luminance degradation compared to the conventional fluorescent panels. This fluorescent panel can be used, for example, as a backlight of a liquid crystal display device.

The phosphor obtained by the manufacturing method of the present invention can be applied also to a fluorescent lamp (e.g., electrodeless fluorescent lamp etc.) according to a known manner. This fluorescent lamp has higher luminance and excellent resistance to luminance degradation compared to the conventional fluorescent lamps.

Hereinafter, the present invention will be described in detail by Examples.

EXAMPLES 1 to 6, and COMPARATIVE EXAMPLE 1 to 3

Examples 1 to 6 are examples of blue silicate phosphors obtained by the manufacturing method of the present invention. Comparative Examples 1 to 3 are examples of blue silicate phosphors obtained by the conventional manufacturing methods under the conditions outside the range of the present invention, while using the same materials and the same manufacturing apparatus as those of the present invention.

Examples 1 to 6 and Comparative Examples 1 to 3 will be described in detail according to the manufacturing methods thereof.

As starting materials, strontium carbonate ($SrCO_3$) having a purity of 99% or more, europium oxide ($Eu_2O_3$) having a purity of 99% or more, magnesium oxide (MgO) having a purity of 99% or more, silicon oxide ($SiO_2$) having a purity of 99% or more, and calcium chloride ($CaCl_2$) having a purity of 99% or more were weighed according to the values of a, b, c and d in the general formula $aSrO \cdot bEuO \cdot MgO \cdot cSiO_2 \cdot dCaCl_2$ shown in Table 1. The weighed starting materials were wet-mixed in pure water for 24 hours using a ball mill. The resulting mixtures further were dried at 120° C. for 24 hours. Thus, mixed powders were obtained.

The obtained mixed powders were pre-fired in an air atmosphere at 1000° C. for 4 hours. After that, they are subjected to heat treatment for 4 hours at firing temperatures and oxygen partial pressures during firing as shown in Table 1 (in Table 1, common logarithms of oxygen partial pressures (atm) during firing are shown. For example, an oxygen partial pressure of $1 \times 10^{-11}$ atm is indicated as "−11"). The relative emission intensities Y/y and chromaticities y of the obtained phosphors were evaluated in the following manner.

The luminances were obtained by irradiating the phosphors with vacuum ultraviolet light at a wavelength of 146 nm in a vacuum and measuring the light emissions in the visible region, and chromaticities y and emission intensities Y/y were calculated from the obtained luminances. Here, Y and y are luminance Y and chromaticity y in the XYZ color coordinate system of International Commission on Illumination. Relative emission intensities Y/y were evaluated as relative values with respect to an emission intensity Y/y of a standard sample BAM:Eu manufactured particularly by the following manner when the emission intensity Y/y of the standard sample is set to 100.

(Manufacturing Method of Standard Sample BAM:Eu)

The standard sample BAM:Eu was manufactured in the following manner. The following amounts of barium carbonate, strontium carbonate, europium oxide, magnesium carbonate, aluminum oxide, and aluminum fluoride, each having high purity (purity of 99.99% or more) were blended:
0.80 mol of $BaCO_3$,
0.10 mol of $SrCO_3$,
0.05 mol of $Eu_2O_3$,
1.00 mol of $MgCO_3$,
5.00 mol of $Al_2O_3$, and
0.01 mol of $AlF_3$.

The above-mentioned constituent element sources were wet-mixed for 10 hours using a ball mill. After that, the resulting mixture was dried at 120° C. for 12 hours so as to obtain a mixed powder. The mixed powder was heated in an air atmosphere at 1300° C. for 4 hours (the rate of temperature increase and the rate of temperature decrease were both 150° C./hour), and then crushed (so as to obtain a pre-fired powder). This pre-fired powder was fired further in a mixed gas atmosphere of 3% of hydrogen and 97% of nitrogen at 1400° C. for 4 hours (the rate of temperature increase and the rate of temperature decrease were both 150° C./hour). The resulting aluminate phosphor having a composition of $Ba_{0.8}Sr_{0.1}Eu_{0.1}MgAl_{10}O_{17}$ thus was obtained as a standard sample BAM:Eu.

The evaluation results are shown in Table 1 and FIG. 1. As is apparent from Table 1 and FIG. 1, the blue silicate phosphors of Examples 1 to 6 obtained by the manufacturing method of the present invention are comparable in chromaticity y to that of the standard sample (a BAM:Eu phosphor) obtained by the conventional manufacturing method, and are superior in relative emission intensity Y/y thereto. In addition, the phosphors of Examples 1 to 6 have chromaticities y closer to that of the standard sample BAM:Eu obtained by the conventional manufacturing method, than the phosphors of Comparative Examples 1 to 3 that were subjected to heat treatment in the atmospheres having oxygen partial pressures outside the range of the manufacturing method of the present invention. The phosphors of Examples 1 to 6 also have higher relative emission intensities Y/y than the phosphors of Comparative Examples 1 to 3. As is clear from these results, the manufacturing method of the present invention makes it possible, without adding Ba, to obtain an excellent blue silicate phosphor having a chromaticity y comparable to that of the standard sample BAM:Eu obtained by the conventional manufacturing method and further having high emission intensity.

TABLE 1

$aSrO \cdot bEuO \cdot MgO \cdot cSiO_2 \cdot dCaCl_2$

| Sample No. | a | b | c | d | Firing temperature/ ° C. | Oxygen partial pressure during firing Common logarithm of oxygen partial pressure/log(atm) | Relative emission intensity Y/y/- | Chromaticity y/- |
|---|---|---|---|---|---|---|---|---|
| Example 1 | 2.991 | 0.009 | 2.000 | 0.010 | 1300 | −14.28 | 101.8 | 0.0584 |
| Example 2 | 2.991 | 0.009 | 2.000 | 0.010 | 1300 | −13.67 | 100.7 | 0.0577 |
| Example 3 | 2.991 | 0.009 | 2.000 | 0.010 | 1300 | −13.05 | 101.8 | 0.0575 |
| Example 4 | 2.991 | 0.009 | 2.000 | 0.010 | 1300 | −12.41 | 109.7 | 0.0575 |
| Example 5 | 2.991 | 0.009 | 2.000 | 0.010 | 1300 | −11 | 108.5 | 0.0577 |
| Example 6 | 2.991 | 0.009 | 2.000 | 0.010 | 1300 | −10.19 | 104.6 | 0.0576 |
| Comparative Example 1 | 2.991 | 0.009 | 2.000 | 0.010 | 1300 | −16 | 97.2 | 0.0872 |
| Comparative Example 2 | 2.991 | 0.009 | 2.000 | 0.010 | 1300 | −9.38 | 95.1 | 0.0567 |
| Comparative Example 3 | 2.991 | 0.009 | 2.000 | 0.010 | 1300 | −8.64 | 81.7 | 0.0580 |
| Standard sample (BAM: Eu) | | | | | | | 100 | 0.0580 |

EXAMPLES 7 and 8

Examples 7 and 8 are examples of blue silicate phosphors obtained by the manufacturing method of the present invention. In Examples 7 and 8, the same materials as those of the above-mentioned Example 4 were blended to have the same composition, and the mixed powders were obtained by the same mixing method. These mixed powders were fired under an oxygen partial pressure of $1 \times 10^{-12.41}$ atm at firing temperatures shown in Table 2 (at 1200° C. in Example 7 and 1400° C. in Example 8) for 4 hours. That is, Examples 7 and 8 are the examples in which the manufacturing methods of the present invention were performed under exactly the same condition as Example 4 but the firing temperatures. The results are shown in Table 2. As is clear from Table 2, the blue silicate phosphors obtained by either of the manufacturing methods of Examples 7 and 8 are, as in the case of the blue silicate phosphor of Example 4, comparable in chromaticity y to that of the standard sample phosphor BAM:Eu obtained by the conventional manufacturing method, and are superior in relative emission intensity Y/y thereto. In other words, it is found that the advantageous effects of the manufacturing method of the present invention can be obtained when the firing temperature is at least in the range of 1200° C. to 1400° C.

EXAMPLES 9 to 14

Examples 9 to 14 are examples of blue silicate phosphors obtained by the manufacturing method of the present invention. Examples 9 and 14 are the examples employing exactly the same materials and exactly the same manufacturing conditions as Example 4 except that the amount of $SrCO_3$ source material to be added was adjusted according to the amounts shown in Table 2. Table 2 shows the evaluation results of the relative emission intensities Y/y and the chromaticities y of the blue silicate phosphors obtained by the manufacturing methods of Examples 9 to 14.

ditions as Example 4 except that the amounts of the $SrCO_3$ source material and the $Eu_2O_3$ source material to be added were adjusted according to the composition conditions shown in Table 2. In other words, as shown in Table 2, the amounts of $SrCO_3$ source material and the $Eu_2O_3$ source material were adjusted so that the values of a and b satisfied a+b=3.0. Table 2 shows the evaluation results of the relative emission intensities Y/y and the chromaticities y of the blue silicate phosphors obtained by the manufacturing methods of Examples 15 to 18.

As is clear from Table 2, the blue silicate phosphors obtained by any of the manufacturing methods of Examples 15 to 18 are, as in the case of the blue silicate phosphor of Example 4, comparable in chromaticity y to that of the standard sample phosphor BAM:Eu obtained by the conventional manufacturing method, and are superior in relative emission intensity Y/y thereto. In other words, it is found that the advantageous effects of the manufacturing method of the present invention can be obtained when the values of a and b in the composition are at least in the ranges of $2.970 \leq a \leq 3.500$ and $0.006 \leq b \leq 0.030$.

EXAMPLES 19 to 22

Examples 19 to 22 are examples of blue silicate phosphors obtained by the manufacturing method of the present inven-

TABLE 2

$aSrO \cdot bEuO \cdot MgO \cdot cSiO_2 \cdot dCaCl_2$

| Sample No. | a | b | c | d | Firing temperature/° C. | Oxygen partial pressure during firing Common logarithm of oxygen partial pressure/log(atm) | Relative emission intensity Y/y/- | Chromaticity y/- |
|---|---|---|---|---|---|---|---|---|
| Example 4 | 2.991 | 0.009 | 2.000 | 0.010 | 1300 | −12.41 | 109.7 | 0.0575 |
| Example 7 | 2.991 | 0.009 | 2.000 | 0.010 | 1200 | −12.41 | 109.2 | 0.0577 |
| Example 8 | 2.991 | 0.009 | 2.000 | 0.010 | 1400 | −12.41 | 110.1 | 0.0576 |
| Example 9 | 2.970 | 0.009 | 2.000 | 0.010 | 1300 | −12.41 | 100.3 | 0.0562 |
| Example 10 | 2.980 | 0.009 | 2.000 | 0.010 | 1300 | −12.41 | 102.4 | 0.0568 |
| Example 11 | 2.990 | 0.009 | 2.000 | 0.010 | 1300 | −12.41 | 108.9 | 0.0570 |
| Example 12 | 3.000 | 0.009 | 2.000 | 0.010 | 1300 | −12.41 | 104.2 | 0.0592 |
| Example 13 | 3.250 | 0.009 | 2.000 | 0.010 | 1300 | −12.41 | 101.1 | 0.0612 |
| Example 14 | 3.500 | 0.009 | 2.000 | 0.010 | 1300 | −12.41 | 100.1 | 0.0645 |
| Example 15 | 2.994 | 0.006 | 2.000 | 0.010 | 1300 | −12.41 | 104.0 | 0.0568 |
| Example 16 | 2.990 | 0.010 | 2.000 | 0.010 | 1300 | −12.41 | 108.5 | 0.0572 |
| Example 17 | 2.980 | 0.020 | 2.000 | 0.010 | 1300 | −12.41 | 104.2 | 0.0610 |
| Example 18 | 2.970 | 0.030 | 2.000 | 0.010 | 1300 | −12.41 | 102.3 | 0.0642 |
| Example 19 | 2.991 | 0.009 | 1.900 | 0.010 | 1300 | −12.41 | 105.3 | 0.0586 |
| Example 20 | 2.991 | 0.009 | 1.950 | 0.010 | 1300 | −12.41 | 107.9 | 0.0582 |
| Example 21 | 2.991 | 0.009 | 2.050 | 0.010 | 1300 | −12.41 | 111.3 | 0.0590 |
| Example 22 | 2.991 | 0.009 | 2.100 | 0.010 | 1300 | −12.41 | 106.3 | 0.0612 |
| Standard sample (BAM: Eu) | | | | | | | 100 | 0.0580 |

As is clear from Table 2, the blue silicate phosphors obtained by any of the manufacturing methods of Examples 9 to 14 are, as in the case of the blue silicate phosphor of Example 4, comparable in chromaticity y to that of the standard sample phosphor BAM:Eu obtained by the conventional manufacturing method, and are superior in relative emission intensity Y/y thereto. In other words, it is found that the advantageous effects of the manufacturing method of the present invention can be obtained when the value of a in the composition is at least in the range of $2.970 \leq a \leq 3.500$.

EXAMPLES 15 to 18

Examples 15 to 18 are examples of blue silicate phosphors obtained by the manufacturing method of the present invention. Examples 15 to 18 are the examples employing exactly the same materials and exactly the same manufacturing contion. Examples 19 and 22 are the examples employing exactly the same materials and exactly the same manufacturing conditions as Example 4 except that the amount of $SiO_2$ source material to be added was adjusted according to the composition conditions shown in Table 2. In other words, as shown in Table 2, the amounts of $SiO_2$ source material was adjusted so that the value of c was in the range of $1.900 \leq c \leq 2.100$. Table 2 shows the evaluation results of the relative emission intensities Y/y and the chromaticities y of the blue silicate phosphors obtained by the manufacturing methods of Examples 19 to 22.

As is clear from Table 2, the blue silicate phosphors obtained by any of the manufacturing methods of Examples 19 to 22 are, as in the case of the blue silicate phosphor of Example 4, comparable in chromaticity y to that of the standard sample phosphor BAM:Eu obtained by the conventional manufacturing method, and are superior in relative emission intensity Y/y thereto. In other words, it is found that the advantageous effects of the manufacturing method of the present invention can be obtained when the value of c in the composition is at least in the range of $1.900 \leq c \leq 2.100$.

EXAMPLES 23 to 27

Examples 23 to 27 are examples of blue silicate phosphors obtained by the manufacturing method of the present invention. Examples 23 to 27 are the examples employing exactly the same materials and exactly the same manufacturing conditions as Example 4 except that the amounts of the $SrCO_3$ source material, the $BaCO_3$ source material and the $CaCO_3$ source material to be added were adjusted according to the composition conditions shown in Table 3. More specifically, strontium carbonate ($SrCO_3$) having a purity of 99% or more, calcium carbonate ($CaCO_3$) having a purity of 99% or more, and barium carbonate ($BaCO_3$) having a purity of 99% or more were used as starting materials, and the amounts of these materials to be added were adjusted according to the compositions shown in Table 3. That is, they were adjusted so that a=2.991 and x=0.100 to 0.200 were satisfied. Table 3 shows the evaluation results of the relative emission intensities Y/y and the chromaticities y of the blue silicate phosphors obtained by the manufacturing methods of Examples 23 to 27.

were adjusted according to the composition conditions shown in Table 3, using zinc oxide (ZnO) having a purity of 99% or more as a Zn source. But otherwise, Examples 28 to 30 are the examples employing exactly the same materials and exactly the same manufacturing conditions as Example 4. Table 3 shows the evaluation results of the relative emission intensities Y/y and the chromaticities y of the blue silicate phosphors obtained by the manufacturing methods of Examples 28 to 30.

As is clear from Table 3, the blue silicate phosphors obtained by any of the manufacturing methods of Examples 28 to 30 are, as in the case of the blue silicate phosphor of Example 4, comparable in chromaticity y to that of the standard sample phosphor BAM:Eu obtained by the conventional manufacturing method, and are superior in relative emission intensity Y/y thereto. In other words, it is found that the advantageous effects of the manufacturing method of the present invention can be obtained even if the value of w in the general formula $aAO \cdot bEuO \cdot (Mg_{1-w},Zn_w)O \cdot cSiO_2 \cdot dCaCl_2$ is greater than 0, that is, even if part of the Mg sites is replaced with Zn element.

EXAMPLE 31

Example 31 is an example of a blue silicate phosphor obtained by the manufacturing method of the present inven-

TABLE 3

$aAO \cdot bEuO \cdot (Mg_{1-w}, Zn_w)O \cdot cSiO_2 \cdot dCaCl_2$
$\{a(Sr_{1-x}, A'_x)O \cdot bEuO \cdot (Mg_{1-w}, Zn_w)O \cdot cSiO_2 \cdot dCaCl_2\}$

| Sample No. | Sr | A' Ca | A' Ba | x | w | b | c | d | Firing temperature/ °C. | Oxygen partial pressure during firing Common logarithm of oxygen partial pressure/log(atm) | Relative emission intensity Y/y/- | Chromaticity y/- |
|---|---|---|---|---|---|---|---|---|---|---|---|---|
| Example 4 | 2.991 | — | — | 0.000 | 0.000 | 0.009 | 2.000 | 0.010 | 1300 | −12.41 | 109.7 | 0.0575 |
| Example 23 | 2.891 | 0.100 | — | 0.100 | 0.000 | 0.009 | 2.000 | 0.010 | 1300 | −12.41 | 108.5 | 0.0588 |
| Example 24 | 2.791 | 0.200 | — | 0.200 | 0.000 | 0.009 | 2.000 | 0.010 | 1300 | −12.41 | 107.4 | 0.0596 |
| Example 25 | 2.891 | — | 0.100 | 0.100 | 0.000 | 0.009 | 2.000 | 0.010 | 1300 | −12.41 | 101.1 | 0.0578 |
| Example 26 | 2.791 | — | 0.200 | 0.200 | 0.000 | 0.009 | 2.000 | 0.010 | 1300 | −12.41 | 100.1 | 0.0582 |
| Example 27 | 2.791 | 0.100 | 0.100 | 0.200 | 0.000 | 0.009 | 2.000 | 0.010 | 1300 | −12.41 | 100.4 | 0.0589 |
| Example 28 | 2.991 | — | — | 0.000 | 0.100 | 0.009 | 2.000 | 0.010 | 1300 | −12.41 | 108.9 | 0.0578 |
| Example 29 | 2.991 | — | — | 0.000 | 0.200 | 0.009 | 2.000 | 0.010 | 1300 | −12.41 | 107.9 | 0.0579 |
| Example 30 | 2.991 | — | — | 0.000 | 0.300 | 0.009 | 2.000 | 0.010 | 1300 | −12.41 | 105.2 | 0.0591 |
| Example 31 | 2.791 | 0.100 | 0.100 | 0.200 | 0.200 | 0.009 | 2.000 | 0.010 | 1300 | −12.41 | 100.2 | 0.0591 |
| Standard sample (BAM: Eu) | | | | | | | | | | | 100 | 0.0580 |

As is clear from Table 3, the blue silicate phosphors obtained by any of the manufacturing methods of Examples 23 to 27 are, as in the case of the blue silicate phosphor of Example 4, comparable in chromaticity y to that of the standard sample phosphor BAM:Eu obtained by the conventional manufacturing method, and are superior in relative emission intensity Y/y thereto. In other words, it is found that the advantageous effects of the manufacturing method of the present invention can be obtained not only when A in the general formula $aAO \cdot bEuO \cdot (Mg_{1-w},Zn_w)O \cdot cSiO_2 \cdot dCaCl_2$ includes one selected from Sr, Ba and Ca, but also when A includes two or more of Sr, Ba and Ca.

EXAMPLES 28 to 30

Examples 28 to 30 are examples of blue silicate phosphors obtained by the manufacturing method of the present invention. Examples 28 to 30 are the examples having a composition in which, starting from the composition of Example 4 as a base composition, part of the Mg amount was replaced with Zn. Specifically, the amounts of source materials to be added tion. Example 31 is the example employing exactly the same materials and exactly the same manufacturing conditions as Example 4 except that the amounts of the $SrCO_3$ source material, the $BaCO_3$ source material and the $CaCO_3$ source material to be added were adjusted according to the composition conditions shown in Table 3 and that part of the Mg amount in the composition was replaced with Zn. More specifically, strontium carbonate ($SrCO_3$) having a purity of 99% or more, calcium carbonate ($CaCO_3$) having a purity of 99% or more, barium carbonate ($BaCO_3$) having a purity of 99% or more, and zinc oxide (ZnO) having a purity of 99% or more were used as starting materials, and the amounts of these materials to be added were adjusted according to the composition shown in Table 3. That is, they were adjusted so that a=2.991 and x=0.200 were satisfied and that part of the Mg sites was replaced with Zn element. But otherwise, Example 31 is the example employing exactly the same materials and exactly the same manufacturing conditions as Example 4. Table 3 shows the evaluation results of the relative emission intensity Y/y and the chromaticity y of the blue silicate phosphor obtained by the manufacturing method of Example 31.

As is clear from Table 3, the blue silicate phosphor obtained by the manufacturing method of Example 31 is, as in the case of the blue silicate phosphor of Example 4, comparable in chromaticity y to that of the standard sample phosphor BAM:Eu obtained by the conventional manufacturing method, and is superior in relative emission intensity Y/y thereto. In other words, it is found that the advantageous effects of the manufacturing method of the present invention can be obtained, even if A in the general formula aAO.bEuO.$(Mg_{1-w},Zn_w)O.cSiO_2.dCaCl_2$ includes two or more elements of Sr, Ba and Ca, and the value of w is greater than 0, that is, even if part of the Mg sites is replaced with Zn element.

EXAMPLES 32 to 36

Examples 32 to 36 are examples of blue silicate phosphors obtained by the manufacturing method of the present invention. Examples 32 and 36 are the examples employing exactly the same materials and exactly the same manufacturing conditions as Example 4 except that the amount of the $CaCl_2$ source material to be added was adjusted according to the composition conditions shown in Table 4. More specifically, Example 32 is the example in which the $CaCl_2$ source material was not added (i.e., d=0). Examples 33 to 36 are the examples in which the amount of the $CaCl_2$ source material to be added was adjusted so that the values of d were 0.02, 0.03, 0.04 and 0.05, respectively. Table 4 shows the evaluation results of the relative emission intensities Y/y and the chromaticities y of the blue silicate phosphor of Example 4 and the blue silicate phosphors obtained by the manufacturing methods of Examples 32 to 36.

TABLE 4 aSrO•bEuO•MgO•cSiO$_2$•dCaCl$_2$

| Sample No. | a | b | c | d | Firing temperature/ °C. | Oxygen partial pressure during firing Common logarithm of oxygen partial pressure/log(atm) | Relative emission intensity Y/y/- | Chromaticity y/- |
|---|---|---|---|---|---|---|---|---|
| Example 4 | 2.991 | 0.009 | 2.000 | 0.010 | 1300 | −12.41 | 109.7 | 0.0575 |
| Example 32 | 2.991 | 0.009 | 2.000 | 0.000 | 1300 | −12.41 | 100.5 | 0.0574 |
| Example 33 | 2.991 | 0.009 | 2.000 | 0.020 | 1300 | −12.41 | 110.3 | 0.0577 |
| Example 34 | 2.991 | 0.009 | 2.000 | 0.030 | 1300 | −12.41 | 108.4 | 0.0576 |
| Example 35 | 2.991 | 0.009 | 2.000 | 0.040 | 1300 | −12.41 | 105.2 | 0.0588 |
| Example 36 | 2.991 | 0.009 | 2.000 | 0.050 | 1300 | −12.41 | 101.3 | 0.0597 |

As is clear from Table 4, the blue silicate phosphor of Example 4 and the blue silicate phosphors obtained by the manufacturing methods of Examples 32 and 36, that is, the blue silicate phosphors whose components are adjusted in such an amount to satisfy $0 \leq d \leq 0.05$, are comparable in chromaticity y to that of the standard sample phosphor BAM:Eu obtained by the conventional manufacturing method, and are superior in relative emission intensity Y/y thereto. In other words, it is found that the advantageous effects of the manufacturing method of the present invention can be obtained when the value of d in the composition is at least in the range of $0 \leq d \leq 0.05$. Since the blue silicate phosphors of Examples 4 and 33 whose components are adjusted in such an amount to satisfy $0 < d \leq 0.02$ in particular have greater relative emission intensities Y/y than the phosphors of other examples, they are more preferred.

EXAMPLE 37

In Example 37, a PDP was manufactured using the blue silicate phosphor (aSrO.bEuO.MgO.cSiO$_2$) obtained by the manufacturing method of the present invention. This PDP has the same structure as that of the above-described example of an AC surface-discharge type PDP (42-inch). As a result, the PDP of Example 37 has a blue chromaticity y comparable to that of a PDP using BAM:Eu that is used conventionally, and also has a blue luminance comparable to or better than that of the conventional PDP. In addition, in this PDP, the luminance degradation along with the image display is inhibited.

Industrial Applicability

The manufacturing method of the present invention makes it possible to obtain a blue silicate phosphor having high luminance and a chromaticity y comparable to that of BAM:Eu and further capable of inhibiting luminance degradation during driving, and therefore is useful. The blue silicate phosphors obtained by the manufacturing method of the present invention can be used not only for a plasma display panel, but also for an electrodeless fluorescent lamp, a fluorescent panel to be used for a backlight of a liquid crystal display device, and the like.

The invention claimed is:

1. A method of manufacturing a blue silicate phosphor represented by the general formula aAO.bEuO.$(Mg_{1-w},Zn_w)$O.CSiO$_2$.dCaCl$_2$, where A is at least one selected from Sr, Ba and Ca, and $2.970 \leq a \leq 3.500$, $0.006 \leq b \leq 0.030$, $1.900 \leq c \leq 2.100$, $0 \leq d \leq 0.05$, and $0 \leq w \leq 1$ are satisfied,
   the method comprising subjecting a mixture of source materials to heat treatment in a gas atmosphere having an oxygen partial pressure of $1 \times 10^{-15.5}$ atm to $1 \times 10^{-10}$ atm at a temperature of 1200° C. to 1400° C.

2. The manufacturing method according to claim 1, wherein the oxygen partial pressure is $1 \times 10^{-13.0}$ atm to $1 \times 10^{-10.1}$ atm.

3. The manufacturing method according to claim 1, wherein the oxygen partial pressure is $1 \times 10^{-12.41}$ atm to $1 \times 10^{-11}$ atm.

4. The manufacturing method according to claim 1, wherein the blue silicate phosphor is represented by the general formula a(Sr$_{1-x}$, A'$_x$)O.bEuO.MgO.cSiO$_2$.dCaCl$_2$, where A' is at least one selected from Ba and Ca, and $2.970 \leq a \leq 3.500$, $0.006 \leq b \leq 0.030$, $1.900 \leq c \leq 2.100$, $0 \leq d \leq 0.05$, and $0 \leq x \leq 0.3$ are satisfied.

5. The manufacturing method according to claim 1, wherein the blue silicate phosphor is represented by the general formula aSrO.bEuO.MgO.cSiO$_2$.dCaCl$_2$, where $2.970 \leq a \leq 3.500$, $0.006 \leq b \leq 0.030$, $1.900 \leq c \leq 2.100$, and $0 \leq d \leq 0.05$ are satisfied.

6. The manufacturing method according to claim 1, wherein $2.982 \leq a \leq 2.994$, $0.006 \leq b \leq 0.018$, c=2.00, and $0 < d \leq 0.02$ are satisfied.

* * * * *

UNITED STATES PATENT AND TRADEMARK OFFICE
CERTIFICATE OF CORRECTION

PATENT NO. : 8,142,684 B2  
APPLICATION NO. : 12/299868  
DATED : March 27, 2012  
INVENTOR(S) : Shiraishi et al.

Page 1 of 1

It is certified that error appears in the above-identified patent and that said Letters Patent is hereby corrected as shown below:

Title page, (56) Reference Cited, under OTHER PUBLICATIONS, line 4-7, delete "Jung, H. et al. "Luminescent properties of $Eu^{2+}$-activated $(Ba,Sr)_3MgSi_2O_8$ phosphor under VUV irradiation", Optical Materials, vol. 28, 2006, pp. 602-605."

Title page, (56) Reference Cited, under OTHER PUBLICATIONS, line 5, insert -- Jung, H. et al. "Luminescent properties of $Eu^{2+}$-activated $(Ba,Sr)_3MgSi_2O_8$ phosphor under VUV irradiation", Optical Materials, vol. 28, 2006, pp. 602-605. --

In column 16, line 24 (claim 1), "$CSiO_2$" should read -- $cSiO_2$ --

Signed and Sealed this  
Sixth Day of November, 2012

David J. Kappos  
*Director of the United States Patent and Trademark Office*